United States Patent [19]

Kortbeek et al.

[11] 4,269,732
[45] May 26, 1981

[54] OLEFIN POLYMERIZATION CATALYSTS

[75] Inventors: Andras G. T. G. Kortbeek; Wilhelmina J. M. van der Linden-Lemmers, both of Amsterdam, Netherlands

[73] Assignee: Shell Oil Company, Houston, Tex.

[21] Appl. No.: 58,406

[22] Filed: Jul. 17, 1979
(Under 37 CFR 1.47)

[30] Foreign Application Priority Data

Jul. 25, 1978 [GB] United Kingdom ............... 30970/78

[51] Int. Cl.$^3$ .............................................. C08F 4/64
[52] U.S. Cl. ................................. 252/429 B; 526/142
[58] Field of Search ..................................... 252/429 B

[56] References Cited

U.S. PATENT DOCUMENTS

| | | | |
|---|---|---|---|
| 3,769,233 | 10/1973 | Hermans et al. | 252/429 B X |
| 3,784,481 | 1/1974 | Lassau et al. | 252/429 B X |
| 3,864,278 | 2/1975 | LaHeij et al. | 252/429 B |
| 4,007,133 | 2/1977 | Rust et al. | 252/429 B |
| 4,060,593 | 11/1977 | Yamaguchi et al. | 252/429 A X |
| 4,110,248 | 8/1978 | Sandis et al. | 252/429 B |
| 4,115,532 | 9/1978 | Yamaguchi et al. | 252/429 B X |
| 4,115,533 | 9/1978 | Yamaguchi et al. | 252/429 B X |
| 4,195,069 | 3/1980 | Kortbeck et al. | 252/429 B X |

FOREIGN PATENT DOCUMENTS 895595 5/1962 United Kingdom .
1391068 4/1975 United Kingdom .

Primary Examiner—Patrick Garvin
Attorney, Agent, or Firm—Martin S. Baer

[57] ABSTRACT

A TiCl$_3$ olefin polymerization catalyst component is prepared by reducing TiCl$_4$ with an aluminum trihydrocarbyl compound in a molar ratio of Ti:Al of 2.7:1 to 4.0:1 in the presence of diisoamyl ether and a hydrocarbon solvent by gradually adding TiCl$_4$ to the aluminum trihydrocarbyl compound and at least a substantial proportion of the diisoamyl ether at a temperature of from 15° to 50° C. during a period of from 0.7 to 2.5 hours to produce a precipitate of TiCl$_3$, and thereafter converting the precipitate into active TiCl$_3$ by heating at a temperature of from 80° to 110° C. during at least 30 minutes. The active TiCl$_3$, when combined with a conventional organoaluminum cocatalyst, provides a stereospecific catalyst for the polymerization of alpha monoolefins having high activity, good morphology and good stereospecificity.

8 Claims, No Drawings

OLEFIN POLYMERIZATION CATALYSTS

The invention is concerned with the preparation of olefin polymerization catalysts and their use in olefin polymerization.

In British patent specification No. 1,391,068 it has been proposed to produce olefin polymerization $TiCl_3$ catalyst components with an attractive activity and a good stereospecific performance by sequentially reducing $TiCl_4$ with an organoaluminum compound to brown beta-$TiCl_3$, reacting this $TiCl_3$ with a complexing agent, such as a dialkylether, and then heating the resulting product in the presence of $TiCl_4$ to a temperature of less than 110° C. to effect conversion of the inactive brown $TiCl_3$ into the active purple modification of $TiCl_3$.

In Netherlands published Patent application No. 7701019, substantially corresponding to U.S. Pat. No. 4,110,248 to Sandis et al, it has been proposed to prepare active $TiCl_3$ by reducing an at least 80% molar excess of $TiCl_4$ in the presence of a complexing agent at a temperature of less than 60° C. and heating the reaction product at a temperature in between 20° and 100° C. In this process no further amounts of $TiCl_4$ and complexing agent are added before the reaction product resulting from the reduction is subjected to heating. Accordingly, whereas the former method essentially relates to a three-step process involving subsequent reduction, complexing and conversion the latter process is basically concerned with a two-step method, viz. reduction followed by conversion into an active modification.

A simplified process for producing active, violet $TiCl_3$, in which reduction and conversion are combined into what is in principle a single stage operation is known from published Netherlands patent application No. 7707676 substantially corresponding to U.S. Pat. No. 4,195,069 to Kortbeek et al. In this proposal violet, active $TiCl_3$ is obtained by reducing $TiCl_4$ with an organoaluminium compound at a temperature in between 60° and 110° C. during a period of at most 1 hour, both reactants participating in the reduction reaction having been premixed with a complexing agent.

British patent specification No. 1,502,883, substantially corresponding in disclosure to U.S. Pat. No. 4,060,593 of Yamaguchi Kazuo et al, is concerned with a process for preparing an active $TiCl_3$ polymerization catalyst component by reducing $TiCl_4$ with an organoaluminium compound in the presence of a complexing agent to form a solution of $TiCl_3$ and precipitating purple $TiCl_3$ from this solution with the aid of a liberating agent.

Modern trends in olefin polymerization technology no longer prescribe that a good $TiCl_3$ catalyst component should merely have an attractive activity combined with a good stereospecific performance. The size and shape of the particulate catalyst component, i.e. morphology, have become more important nowadays as has the phenomenon of decrease of catalytic activity during polymerization. The latter is of particular importance for the liquid bulk polymerization method in which liquid olefin monomer is used as suspension medium. Hence, the present demands for suitable $TiCl_3$ catalyst components are: good activity and good stereospecific performance, combined with an attractive morphology and the ability to maintain the activity during polymerization at the high initial level for a considerable period of time. Other demands typical for catalyst preparation methods are: the need to avoid as far as possible unnecessary processing steps and to conceive recipes that have a fair tolerance for the variations that normally occur in catalyst preparation on a commercial scale, without impairing the desired morphology of the catalyst component.

It has been found that none of the prior art processes indicated above can satisfy those combined demands and it is therefore an object of the present invention to provide an improved method for the preparation of a $TiCl_3$ olefin polymerization catalyst component.

In accordance with the invention olefin polymerization $TiCl_3$ catalyst components are produced by reducing $TiCl_4$ with an aluminum trihydrocarbyl compound in a molar ratio Ti:Al of 2.7:1 to 4.0:1 in the presence of diisoamylether and a hydrocarbon solvent by gradually adding $TiCl_4$ to the aluminum trihydrocarbyl compound at a temperature of from 15° to 50° C. during a period of from 0.7 to 2.5 hours to produce a precipitate of $TiCl_3$ and converting this precipitate into active $TiCl_3$ by heating at a temperature of from 80° to 110° C. during at least 30 minutes.

Preferred Ti:Al molar ratios to be employed in this invention are from 2.9:1 to 3.5:1, particularly preferred are ratios in between 2.95:1 and 3.3:1.

The hydrocarbon solvent may be any one of the solvents normally employed in the preparation of Ziegler/Natta type catalysts, for example paraffinic solvents such as heptane, hexane, isooctane or cyclohexane and preferably aromatic solvents such as benzene, toluene, xylene, cumene etc. and mixtures thereof. Preferably the amount of solvent employed is such as to produce a $TiCl_3$ concentration of less than 2 mol/l solvent, particularly in between 0.5 and 1.5 mol/l solvent. Typical aluminum trihydrocarbyl compounds are those with 2–8 carbon atoms in each hydrocarbyl group, e.g. Al-triethyl, Al-triisobutyl, Al-triisopropyl, and Al-trihexyl. The three hydrocarbyl groups, preferably alkylgroups, do not need to be all the same.

The order of contacting the Ti with the Al compound is of critical importance: the reverse order of addition will produce a catalyst component with less desirable properties. It is also critical that the addition proceeds slowly, i.e. the total amount of one reactant should not be added to the other within a period of less than 0.7 hour. This gradual, slow addition effects a well controlled, regular growth of catalyst particles and governs the formation of smooth, round particles. The same holds for the temperature at which the reactants are combined, this is set at the rather narrow range of from 15° to 50° C., temperatures of from 25° to 45° C. being particularly preferred. Preferred addition periods are from 1 to 2 hours.

Another critical aspect of this invention is the presence of diisoamylether during the reduction of $TiCl_4$. In general, at least a substantial proportion of the ether is included into the aluminum trihydrocarbyl solution before the latter is reacted with $TiCl_4$. It is also possible, although less preferred, to premix both the aluminum compound and $TiCl_4$ with diisoamylether before one compound is added to the other. The total amounts of diisoamylether to be employed in the process of this invention are preferably set by the following ether/Al molar ratios: from 2:1 to 3.5:1, most preferably of from 2.5:1 to 3:1. These ratios are also to be observed when premixing part of the ether with $TiCl_4$.

At the end of the gradual contacting of the reactants participating in the reduction reaction, reduction may not be entirely complete. In such event the reaction mixture is kept at the same or slightly higher temperature, under stirring, preferably for a period of up to 30 hours, dependent upon the temperature and length of the addition period. The reduced reaction product is obtained in the form of a suspension of fine solid particles in a liquid-medium. The solid TiCl$_3$ particles have a dark brown, blackish color. The brown color can probably be ascribed to the presence of beta TiCl$_3$ and the blackish color most likely points to the presence of small amounts of overreduced, divalent titanium.

The TiCl$_3$ so obtained is then converted into active TiCl$_3$ by heating at a temperature of from 80° to 110° C. for at least 30 minutes, and more preferably at a temperature of from 85° to 95° C. for a period of from 0.75 to 2.5 hours. Agglomeration of particles during this conversion should be avoided and this can normally be achieved by stirring.

The active TiCl$_3$ catalyst component finally obtained is characterized by having a color which is neither the typical brown color of the beta modification of TiCl$_3$ nor the typical purple color of the gamma or delta modification. Instead the color may at best be referred to as dark purple/brown. Also X-ray data show that the active catalyst component is neither alpha, nor beta, nor gamma, nor delta TiCl$_3$. To remove any remaining unreacted material from the catalyst component, the latter may be washed with an aliphatic or aromatic hydrocarbon.

In the polymerization of olefins, preferably propylene, the TiCl$_3$ catalyst component is used together with conventional organoaluminium compounds often referred to as "activator" or "cocatalyst". Typical representatives of such compounds are diethylaluminum chloride, diisopropylaluminum chloride, ethylaluminum sesquihalide and the like. In general the activator can be any compound of the general formula $AlR_n X_{3-n}$, wherein R is alkyl with 2–8 carbon atoms and n is any number of from 1 to 3, preferably 2 and X is halogen, preferably chlorine.

Before polymerization is started one or both of the components forming the catalytic system or the catalyst system per se can be reacted with a non-enolisable carbonyl compound to increase the stereospecific performance of the system. Suitable compounds are esters, ketones, aldehydes and organic carbonates in which the alpha carbon atom (with respect to the carbonylgroup) is a tertiary carbon atom or a secondary carbon atom which carries a hydrogen atom to which access is difficult because of steric hindrance, or a carbon atom forming part of an aromatic ring structure. Suitable carbonyl compounds are di-t-butyl ketone, diisopropyl ketone, isopropyl-t-amyl ketone, diethyl carbonate, diethyl terephthalate, benzophenone, diphenyl carbonate, p-methoxy ethyl benzoate, ethyl methacrylate, methyl methacrylate, ethyl benzoate and p-ethoxy methyl benzoate. Other compounds which may be used for the same purpose are strong Lewis bases such as trialkyl amines, trialkyl phosphines or trialkyl borates. It is also possible to employ any of such compounds improving the stereospecifity of the catalytic system by incorporating them simply in the polymerization mixture.

Polymerization of olefins with the catalysts of this invention can be effected by any conventional method, for example by the gas phase or liquid bulk method or by slurry polymerization in the presence of an inert hydrocarbon solvent. To terminate the polymerization the catalyst can be deactivated by any means known per se, i.e. by addition of alcohols, such as ethanol or butanol, ketones, such as methyl-ethyl or methyl-isobutyl ketone, acetone, ethers e.g. tetrahydrofuran and similar compounds.

Hydrogen may be employed during polymerization to achieve molecular weight control. When doing so it is recommended to employ H$_2$ concentrations of from 0.5–5% vol, preferably 1–3.3% vol. Particularly in the last range one achieves a surprising increase in the activity of the catalyst system.

EXAMPLE 1

(a) Preparation of active TiCl$_3$

A solution comprising 150 mmol TiCl$_4$ in 100 ml toluene was added dropwise at room temperature to a stirred solution comprising 50 mmol aluminum triethyl, 125 mmol diisoamylether and 50 ml toluene. Soon after the first drops were added the temperature of the latter solution rose to 35° C. and it was kept at that level by externally cooling the reaction vessel. The gradual addition was continued for 90 minutes. Then, stirring was continued for 2 hours at 50° C. The resulting suspension of brown TiCl$_3$ was subsequently heated at 90° C. during 60 minutes to produce an active TiCl$_3$ of dark purple/brown color. The hydrocarbon solvent was removed from the catalyst suspension by decantation and the TiCl$_3$ was washed five times with iso-octane. Particle size was 12–20 μm, particle size distribution was very even, all particles had a regular, round shape.

(b) Polymerization 1.7 mmol active TiCl$_3$ was introduced into a 3 l. reaction vessel comprising 9 mmol diethylaluminium chloride and 1.5 l. iso-octane. The reactor was pressurized with propylene to 255 kPa and polymerization was effected at 70° C. during 4 hours in the presence of 1% vol. of hydrogen. At the end, the polymerization was stopped by deactivating the catalyst with butanol and the polymer was washed with 1% aq. HCl and three times with water. After steam distillation, the polymer was filtered off and dried.

In this polymerization run the active TiCl$_3$ catalyst showed an activity, expressed as g polymer per g catalyst per hour per 98 kPa (g/g TiCl$_3$/hr/98 kPa), of 190.

The stereospecific performance of the catalyst, expressed as percentage of material that was soluble in xylene, was 10.2%.

The same polymerization run is used as standard experiment for testing the catalysts prepared in Examples 2 to 6, 8 to 10 and B to J. The xylene solubles content of the polymer was determined by dissolving the polymer in boiling xylene, cooling the solution to room temperature, filtering off precipitated polymer and determining the weight of the polymer remaining in solution.

EXAMPLE 2

Example 1 was repeated, now employing an addition period of 60 minutes but keeping all other conditions unchanged. The purple/brown TiCl$_3$ catalyst component so obtained had a morphology identical to that indicated in Example 1. The polymerization activity was 172 g/g TiCl$_3$/hr/98 kPa, the xylene solubles content of the polymer was 11.7%.

EXAMPLE 3

Example 2 was repeated employing an addition temperature of 45° C., but leaving all other conditions unchanged. Catalyst morphology showed a particle size of 15–25 μm and all other features as indicated in Example 1. The color of the TiCl$_3$ catalyst component was dark purple/brown. The polymerization activity was 154 g/g TiCl$_3$/hr/98 kPa the xylene solubles content of polymer was 11.5%.

EXAMPLE 4

Example 1 was repeated, now again amploying 125 mmol of diisoamylether of which 50 mmol was included in the solution of aluminum triethyl and 75 mmol was included in the solution of TiCl$_4$. Also 125 ml of toluene was used instead of 150 ml, 43 ml of this toluene was included in the aluminum triethyl solution, the remainder in the TiCl$_4$ solution. Otherwise all remaining conditions were maintained.

Catalyst component color and morphology were as indicated in Example 1. The polymerization activity was 172 g/g TiCl$_3$/hr/98 kPa; the xylene solubles content of the polymer was 9.9%.

EXAMPLE 5

Example 1 was repeated now employing 150 instead of 125 mmol diisoamylether. All other conditions were kept unchanged. Catalyst component morphology included a particle size of 9 to 12 μm but otherwise all other features indicated in Example 1. The color of the catalyst component was dark purple/brown. The polymerization activity was 150 g/g TiCl$_3$/hr/98 kPa, the xylene solubles content of the polymer was 13.3%.

EXAMPLE 6

Example 1 was repeated, now employing heating the TiCl$_3$ suspension, after introducing the last drop of TiCl$_4$ solution, to 90° C. in a period of 150 minutes. Then the suspension was kept at 90° C. during 60 minutes. The catalyst component had the same color and morphology as indicated in Example 1. The polymerization activity was 190 g/g TiCl$_3$/hr/98 kPa. The xylene solubles content of the polymer was 11.1%.

EXAMPLE 7

The catalyst component obtained in Example 6 was subjected to polymerization in the presence of 1.4% vol. of hydrogen, respectively 3.1% vol. of hydrogen. Otherwise the polymerization conditions were identical to those described in Example 1(a).

Polymerization activity: (1.4% vol. H$_2$)-224 g/g TiCl$_3$/hr/98 kPa; (3.1% vol. H$_2$)- 188 g/g TiCl$_3$/hr/98 kPa.

Xylene solubles content of polymer: (1.4% vol. H$_2$)-10.8%; (3.1% vol. H$_2$)-13.0%.

EXAMPLE 8

A solution comprising 225 mmol TiCl$_4$ and 75 ml toluene was slowly added during 60 minutes to a stirred solution of 75 mmol aluminum triethyl, 187 mmol diisoamylether and 150 ml toluene at a temperature of 35° C. Then, stirring was continued for 2 hours at 50° C. and the resulting TiCl$_3$ suspension was subsequently heated at 80° C. during 60 minutes. The resulting active TiCl$_3$ catalyst component had the same color and morphology as indicated in Example 1. The polymerization test showed an activity of 182 g/g TiCl$_3$/hr/98 kPa; the xylene solubles content of the polymer was 15.1%.

EXAMPLE 9

Example 8 was repeated employing a final heating period of 60 minutes at 100° C. instead of 80° C. All other conditions remained unchanged. Catalyst color and morphology were as indicated in Example 1, the polymerization activity was 183 g/g TiCl$_3$/hr/98 kPa; the xylene solubles content of the polymer was 11.5%.

COMPARATIVE EXAMPLES A–J

A. Example 6 was repeated using an addition temperature of 90° C. instead of 35° C., but leaving all other conditions unchanged. The catalyst component so obtained showed a polymerization activity in the presence of 1.4% vol. H$_2$ of 102 g/g TiCl$_3$/hr/98 kPa; the xylene solubles content of the polymer was 6.2%. Catalyst morphology was less favorable than that of the catalyst component prepared in Example 6: the catalyst was sticky, the particles were of irregular shape and showed a strong tendency to agglomerate. Also the color of the catalyst component was more purple than that of the catalyst produced in Example 6.

B. Example 1 was repeated employing an addition time of 3.5 minutes while leaving all other conditions unchanged. The polymerization test described in Example 1(b) now showed an activity of 144 g/g TiCl$_3$/hr/98 kPa; the xylene solubles content of the polymer was 13.2%. Catalyst morphology was less favorable than that of the catalyst component prepared in Example 1: the particles showed an irregular shape and the particle size distribution was less even.

C. Example 1 was repeated, now employing an activation temperature of 70° C. instead of 90° C. All other conditions were kept unchanged. The standard polymerization test showed an activity of 174 g/g TiCl$_3$/hr/98 kPa; the xylene solubles content of the polymer was 20.1%. The color of the catalyst component was dark brown.

D. Example 1 was repeated employing a different order of addition of the reactants: i.e. the solution of aluminum triethyl was now added to the TiCl$_4$ solution. 50 mmol of diisoamylether was included in the former solution and 75 mmol in the latter. Otherwise, all remaining conditions were maintained. Polymerization activity was 139 g/g TiCl$_3$/hr/98 kPa; the xylene solubles content of the polymer was 20.5%, thus indicating the poor stereospecific performance of the catalyst.

E. Example 1 was repeated employing 125 mmol of dibutylether instead of diisoamylether. All other conditions remained unchanged. Polymerization activity was 178 g/g TiCl$_3$/hr/98 kPa, the xylene solubles content of the polymer was 5.3%. However, catalyst morphology was now inferior: the particle size ranged from 5 to 50 μm; also the particles were of irregular shape and particle size distribution was less even, showing a relatively large content of particles having a diameter of 10 μm and less. The color of the catalyst component was purple.

F. Example 1 was repeated, now employing 75 mmol of aluminum triethyl (Ti:Al molar ratio 2:1). All other conditions were kept unchanged. The polymerization activity of the catalyst was 140 g/g TiCl$_3$/hr/98 kPa; the xylene solubles content of the polymer was 19.4%. Catalyst morphology was inferior, showing the presence of a relatively large fraction of coarse irregular particles with a size of from 50 to 80 μm.

G. Example 1 was repeated using an addition period of 3 hours while leaving all other conditions unchanged.

The polymerization activity of the catalyst was 102 g/g TiCl$_3$/hr/98 kPa, the xylene solubles content of the polymer was 12.5%.

H. Example 1 was repeated while omitting the heating at 90° C. during one hour. All other conditions remained unchanged. Polymerization activity was 127 g/g TiCl$_3$/hr/98 kPa; the xylene solubles content of the polymer was 27.3%.

J. (cf. Example 3 of U.S. Pat. No. 4,110,248 to Saudis et al. A solution of 250 mmol diethylaluminum chloride, 170 mmol diisoamylether and 180 ml heptane was added dropwise at 35° C. during 4 hours to a solution of 2000 mmol TiCl$_4$, 440 mmol diisoamylether and 120 ml heptane. Thereafter, stirring was continued at 35° C. for one hour. Then, the suspension was heated at 65° C. for 2 hours, the liquid medium was removed from the suspension by decantation and the catalyst component was washed five times with iso-octane. The catalyst component so produced had a purple color and an irregular morphology: particle size ranged from 20 to 50 μm and a relatively high portion of the particles had an irregular shape. The polymerization activity was 153 g/g TiCl$_3$/hr/98 kPa and the xylene solubles content of the polymer was 11.0%.

EXAMPLE 10

A solution comprising 2400 mmol TiCl$_4$, and 2400 mmol diisoamylether was slowly added during 60 minutes at 35° C. to a stirred solution comprising 800 mmol aluminum triethyl, 2000 mmol diisoamylether and 1600 ml toluene. Then, the resulting suspension was gradually heated to 90° C. in a period for 60 minutes and kept at that temperature during 2 hours. The resulting active TiCl$_3$ had the same color and morphology as described in Example 1. The polymerization activity was 179 g/g TiCl$_3$/hr/98 kPa. The xylene solubles content of the polymer was 9.8%.

EXAMPLE 11

The catalyst component prepared in accordance with Example 10 was tested in polymerization of propylene using the liquid bulk method.

3.5 l of liquid propylene monomer was introduced into a 5 l stirred autoclave at 60° C. Then 1.5 mmol of diethylaluminium chloride was added, followed by the introduction of 0.5 mmol TiCl$_3$ suspended in 10 ml isobutane. Another portion of 1.5 mmol of diethylaluminium chloride was finally introduced thus yielding an Al:Ti molar ratio of 6:1. H$_2$ was constantly supplied to the reactor to give a 2.0% vol. H$_2$ concentration in the gas phase in the reactor. No further propylene was added and the polymerization was continued at 2550 kPa for 4 hours at 60° C. Then the polymerization was stopped by releasing the pressure. This caused the remaining monomer to evaporate completely, together with the small amount of isooctane. The dry polymer powder was weighed and analyzed to determine particle size distribution, bulk density and xylene solubles content.

Polymer yield: 2505 g/g TiCl$_3$/hr;
Polymer xylene solubles: 7.1%;
Polymer bulk density: 0.41 g/ml;
Polymer particle size distribution: narrow, with regular round polymer particles, exhibiting excellent flow characteristics.

EXAMPLE 12

0.25 mmol p-methoxyethyl benzoate was reacted with 3 mmol diethylaluminium chloride at 25° C. during 10 minutes in the presence of 8 ml isooctane. Then, the reaction product, together with a suspension in 10 ml issooctane of 0.5 mmol TiCl$_3$ obtained in accordance with Example 10, was introduced into the polymerization reaction system described in Example 11 and polymerization was effected at 60° C. during 4 hours in the presence of 2.0% vol. H$_2$.

The following results were obtained:
Polymer yield: 2353 g/g TiCl$_3$/hr;
Polymer xylene solubles: 5.3%;
Polymer bulk density: 0.43 g/ml;
Polymer particle size distribution: narrow, with regular round polymer particles, excellent flow characteristics.

EXAMPLE 13

0.10 mmol p-methoxy ethyl benzoate was reacted at 50° C. during 1 hour with a mixture of 3 mmol diethylaluminium chloride and 0.5 mmol TiCl$_3$ obtained in accordance with Example 10. This reaction was effected in the presence of 10 ml isooctane diluent. The resulting reaction product was introduced in the polymerization reaction system described in Example 11.

Polymer yield: 1991 g/g TiCl$_3$/hr;
Polymer xylene solubles: 2.8%;
Polymer bulk density: 0.47 g/ml;
Polymer particle size distribution: narrow, with regular, round polymer particles, excellent flow characteristics.

COMPARATIVE EXAMPLE K

The catalyst component prepared in accordance with Example J was subjected to the same polymerization method as described in Example 11.

Polymer yield: 2425 g/g TiCl$_3$/hr;
Polymer xylene solubles: 8.2%;
Polymer bulk density: 0.33 g/ml;
Particle size distribution: broad, with relatively high proportions of coarse particles.

EXAMPLE 14

A solution comprising 2400 mmol TiCl$_4$, 1200 mmol diisoamylether and 600 ml toluene was added during 60 minutes at 20° C. to a stirred solution comprising 800 mmol aluminum triethyl, 800 mmol diisoamylether and 1600 ml toluene. Then the resulting mixture was gradually heated to 90° C. in 2.5 hours and kept at temperature for two hours while stirring. After settling, the catalyst component was washed six times with toluene.

0.5 mmol of the above TiCl$_3$ catalyst component so obtained, was introduced into the polymerization system described in Example 11 and tested under the polymerization conditions included therein apart from the polymerization temperature, which was now set at 70° C., and the polymerization period, which was set at 3.5 hours. The following data were obtained:

Polymer yield: 4225 g/g TiCl$_3$/hr;
Polymer xylene solubles: 7.2%;
Polymer bulk density: 0.39 g/ml;
Polymer flow: 75/100 ml;
Polymer particle size distribution: narrow, with round regular polymer particles.

EXAMPLE 15

0.25 mmol p-methoxy ethyl benzoate was reacted with 3 mmol diethylaluminum chloride at 60° C. for one hour in the presence of 5 ml isooctane. A suspension of 0.5 mmol active $TiCl_3$ produced as described in example 14 and suspended in 10 ml iso-octane was added and the mixture was kept at 60° C. during one hour. Then the mixture was tested with the polymerization method indicated in example 14 (temp. 70° C., time 3.5 hours). The following results were obtained:

Polymer yield: 3529 g/g $TiCl_3$/hr;
Polymer xylene solubles: 2.6%;
Polymer bulk density: 0.45 g/l;
Polymer flow: 75/100 ml;
Polymer particle size distribution: narrow, with regular, round polymer particles.

EXAMPLE 16

A solution comprising 225 mmol $TiCl_4$ and 75 ml toluene was added during 2 hours at 30° C. to a stirred solution comprising 75 mmol aluminum triethyl and 187 mmol diisoamylether in 150 ml toluene. The mixture was kept at 30° C. for 20 hours and the precipitated $TiCl_3$ particles were then washed with toluene, and resuspended in toluene. This suspension was heated to 90° C. in 10 minutes and kept at that temperature for 2 hours.

0.5 mmol of the resulting suspension of active $TiCl_3$ in toluene was introduced into the polymerization system described in Example 11, employing polymerization during 4 hours in the presence of 2.0% vol. $H_2$, at 60° C.

Polymer yield: 2300 g/g $TiCl_3$/hr;
Polymer xylene solubles: 4.8%;
Polymer bulk density: 0.43 g/ml;
Polymer flow: 75/100 ml.

Although the present invention has been described with particular reference to the use of diisoamyl ether, the invention is not limited thereto. Other dialkyl ethers with two branched alkyl groups each containing 6 to 14 carbon atoms can be used instead of diisoamyl ether.

We claim:

1. In the process for the preparation of an olefin polymerization catalyst component comprising reducing $TiCl_4$ with an organoaluminum compound in the presence of a dialkyl ether, the improvement of reducing $TiCl_4$ with an aluminum trihydrocarbyl compound in a molar ratio of Ti:Al of 2.7:1 to 4.0:1 in the presence of diisoamyl ether and a hydrocarbon solvent by gradually adding $TiCl_4$ to the aluminum trihydrocarbyl compound and at least a substantial proportion of the diisoamyl ether at a temperature of from 15° to 50° C. during a period of from 0.7 to 2.5 hours to produce a precipitate of $TiCl_3$, and thereafter converting said precipitate into active $TiCl_3$ by heating at a temperature of from 80° to 110° C. during at least 30 minutes.

2. A process as claimed in claim 1, in which the gradual addition is effected at a temperature of from 25° to 45° C., the Ti:Al molar ratio employed is from 2.95:1 to 3.3:1, and the aluminum compound is an aluminum trialkyl compound in which each of the alkyl groups has from 2 to 8 carbon atoms.

3. A process as claimed in claim 2, in which the aluminum compound is triethylaluminum and is premixed with all of the diisoamyl ether before $TiCl_4$ is added thereto, the premixing being effected employing a molar ratio of ether to Al of from 2:1 to 3.5:1.

4. A process as claimed in claim 3, in which the gradual addition is carried out in a period of from 1 to 2 hours, and the activation is effected during a period of 0.75 to 2.5 hours at a temperature from 85° to 95° C.

5. A process for the preparation of an olefin polymerization catalyst comprising reducing $TiCl_4$ with an aluminum trihydrocarbyl compound in a molar ratio of Ti:Al of 2.7:1 to 4.0:1 in the presence of diisoamyl ether and a hydrocarbon solvent by gradually adding $TiCl_4$ to the aluminum trihydrocarbyl compound and at least a substantial proportion of the diisoamyl ether at a temperature of from 15° to 50° C. during a period of from 0.7 to 2.5 hours to produce a precipitate of $TiCl_3$, thereafter converting said precipitate into active $TiCl_3$ by heating at a temperature of from 80° to 110° C. during at least 30 minutes, and combining said active $TiCl_3$ with an effective amount of a cocatalyst of the formula $AlR_nX_{3-n}$, wherein R is an alkyl of 2–8 carbon atoms, X is a halogen and n has a value from 1 to 3.

6. A process as claimed in claim 5, in which the gradual addition is effected at a temperature of from 25° to 45° C., the Ti:Al molar ratio employed in the reduction step is from 2.95:1 to 3.3:1, and the aluminum compound employed in the reduction step is an aluminum trialkyl compound in which each of the alkyl groups has from 2 to 8 carbon atoms.

7. A process as claimed in claim 6, in which the aluminum compound employed in the reduction step is triethylaluminum and is premixed with diisoamyl ether before $TiCl_4$ is added thereto, the premixing being effected employing a molar ratio of ether to Al of from 2:1 to 3.5:1, and the aluminum compound employed as cocatalyst is diethylaluminum chloride.

8. A process as claimed in claim 7, in which the gradual addition is carried out in a period of from 1 to 2 hours, and the activation is effected during a period of 0.75 to 2.5 hours at a temperature from 85° to 95° C.